United States Patent
Goda et al.

(10) Patent No.: US 9,823,622 B2
(45) Date of Patent: Nov. 21, 2017

(54) DRIVE FORCE TRANSMISSION DEVICE HAVING AIR CHANNELS AND IMAGE FORMING APPARATUS

(71) Applicant: FUJI XEROX CO., LTD., Tokyo (JP)

(72) Inventors: Toshihiro Goda, Kanagawa (JP); Chihiro Iijima, Kanagawa (JP); Kazuyuki Yagata, Kanagawa (JP); Shohei Miyagawa, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/944,641

(22) Filed: Nov. 18, 2015

(65) Prior Publication Data

US 2016/0342137 A1 Nov. 24, 2016

(30) Foreign Application Priority Data

May 21, 2015 (JP) .................................. 2015-103411

(51) Int. Cl.
*G03G 21/20* (2006.01)
*F16H 57/027* (2012.01)

(52) U.S. Cl.
CPC ......... *G03G 21/206* (2013.01); *F16H 57/027* (2013.01); *G03G 2221/1645* (2013.01)

(58) Field of Classification Search
CPC .......... G03G 21/206; G03G 2221/1645; F16H 57/027

USPC ............................... 399/92, 93; 454/261, 345
See application file for complete search history.

(56) References Cited

U.S. PATENT DOCUMENTS

| 7,941,069 | B2 * | 5/2011 | Idehara | G03G 21/1857 399/92 |
| 8,676,081 | B2 * | 3/2014 | Yamashita | G03G 15/0887 399/92 |
| 8,693,915 | B2 * | 4/2014 | Nozaki | G03G 21/1619 399/110 |
| 9,158,274 | B2 * | 10/2015 | Sato | G03G 21/206 |
| 2014/0199091 | A1 * | 7/2014 | Azeyanagi | G03G 21/1647 399/92 |

FOREIGN PATENT DOCUMENTS

| JP | 2005-090574 A | | 4/2005 |
| JP | 2005090574 A | * | 4/2005 |
| JP | 2008051937 A | * | 3/2008 |
| JP | 2008-268529 A | | 11/2008 |
| JP | 2010107694 A | * | 5/2010 |
| JP | 2011215629 A | * | 10/2011 |

* cited by examiner

*Primary Examiner* — Robert Beatty
(74) *Attorney, Agent, or Firm* — Oliff PLC

(57) ABSTRACT

A drive force transmission device includes a frame that supports therein plural gears transmitting a rotational drive force and that has a flat portion extending in a direction intersecting a direction in which the rotational drive force is transmitted. The drive force transmission device has an air channel that allows air sucked from an outside of the frame to pass therethrough so as to exhaust the air to the outside of the frame.

7 Claims, 8 Drawing Sheets

DRIVE FORCE TRANSMISSION DEVICE HAVING AIR CHANNELS AND IMAGE FORMING APPARATUS

CROSS-REFERENCE TO RELATED APPLICATIONS

This application is based on and claims priority under 35 USC 119 from Japanese Patent Application No. 2015-103411 filed May 21, 2015.

BACKGROUND

Technical Field

The present invention relates to a drive force transmission device and an image forming apparatus.

SUMMARY

According to an aspect of the present invention, a drive force transmission device includes a frame that supports therein plural gears transmitting a rotational drive force and that has a flat portion extending in a direction intersecting a direction in which the rotational drive force is transmitted. The drive force transmission device has an air channel that allows air sucked from an outside of the frame to pass therethrough so as to exhaust the air to the outside of the frame.

BRIEF DESCRIPTION OF THE DRAWINGS

Exemplary embodiment of the present invention will be described in detail based on the following figures, wherein.

DETAILED DESCRIPTION

Figure 1:
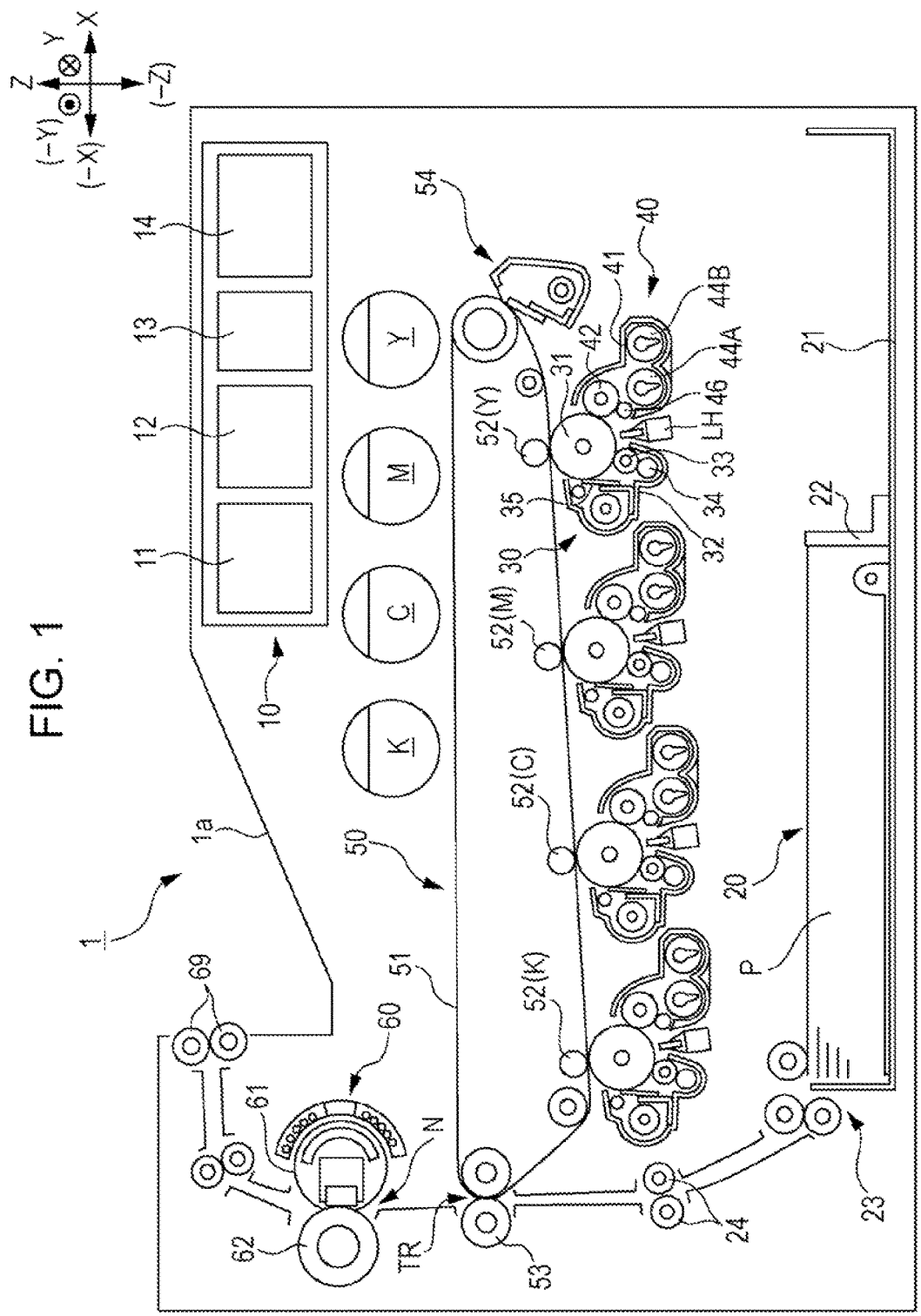
FIG. 1 is a schematic sectional view of an internal structure of an image forming apparatus.

Next, an exemplary embodiment and a specific example according to the present invention will be described with reference to the drawings in further detail below. It should be understood that the present invention is not limited to the exemplary embodiment and the specific example.

Furthermore, it should be noted that the drawings referred to in the following description are schematically illustrated and not to scale, and illustration of elements not required for the description is omitted as appropriate for ease of understanding.

For ease of understanding of the description hereafter, the front-rear direction, the left-right direction, and the vertical direction are respectively defined as the X direction, the Y direction, and the Z direction in the drawings.

(1) An Overall Structure and Operations of an Image Forming Apparatus

FIG. 1 is a schematic sectional view of an internal structure of an image forming apparatus 1 for which a drive force transmission device 100 according to an exemplary embodiment is used.

An overall structure and operations of the image forming apparatus 1 are described below with reference to the drawings.

The image forming apparatus 1 includes a controller 10, a sheet feed device 20, photosensitive units 30, developing devices 40, a transfer device 50, and a fixing device 60. An output tray 1a is formed on an upper (+Z direction) surface of the image forming apparatus 1. Sheets of paper on which images are recorded are output to and received by the output tray 1a.

The controller 10 includes components such as an image-forming-apparatus controller 11, a data converter 12, a light exposure controller 13, and a power source unit 14. The image-forming-apparatus controller 11 controls operations of the image forming apparatus 1. The data converter 12 prepares image data in response to a print processing request. The light exposure controller 13 controls turning on of lighting by a light exposure devices LH. The power source unit 14 applies high voltages to components such as charging rollers 32, developing rollers 42, first transfer rollers 52, and a second transfer roller 53, which are to be described later. The power source unit 14 also supplies power to the light exposure devices LH, the sheet feed device 20, the fixing device 60, and sensors and the like provided in these components.

The data converter 12 converts print information received from an external information transmission device (for example, a personal computer or the like) into image information for forming a latent image and outputs this image information to the light exposure devices LH in the form of drive signals at preset timing. The light exposure devices LH according to the present exemplary embodiment each include a light-emitting-diode (LED) head in which plural LEDs are linearly arranged in a main scanning direction.

The sheet feed device 20 is provided at a bottom portion of the image forming apparatus 1. The sheet feed device 20 includes a sheet loading plate 21. Many sheets of paper P are loaded on an upper surface of the sheet loading plate 21. Each of the sheets P serves as a recording medium. The position in the width direction of the sheets P loaded on the sheet loading plate 21 is determined by a regulating plate (not illustrated). These sheets P are drawn forward (−X direction) one after another from the uppermost sheet by a sheet drawing member 22. Each of the sheets P having been drawn is then transported to a nip of a registration roller pair 23.

The photosensitive units 30 are arranged parallel to one another above (+Z direction) the sheet feed device 20 and include respective photosensitive drums 31, which are rotated. The charging roller 32, the light exposure device LH, the developing device 40, the first transfer roller 52, and a cleaning blade 34 are arranged around each of the photosensitive drums 31 in a rotating direction of the photosensitive drum 31. A cleaning roller 33 that cleans a surface of the charging roller 32 is disposed so as to face and be in contact with the charging roller 32.

The developing device 40 includes a developing housing 41 that contains developer therein. The developing roller 42 and a pair of transport augers 44A and 44B are disposed in the developing housing 41. The developing roller 42 that serves as a developer holding body faces the photosensitive drum 31. The transport augers 44A and 44B are disposed on a lower rear side of the developing roller 42. The transport augers 44A and 44B agitate the developer and transport the developer to the developing roller 42 side. A layer thickness regulating member 46 that regulates the thickness of a layer of the developer is disposed near the developing roller 42.

There are no big differences between the structures of the developing devices 40 except for the developer contained in the developing housings 41. Yellow (Y), magenta (M), cyan (C), and black (K) toner images are formed by the respective developing devices 40.

The surface of the rotating photosensitive drum 31 is charged by the charging roller 32. An electrostatic latent image is formed on the charged surface of the photosensitive drum 31 by latent-image forming light emitted from the light exposure device LH. The electrostatic latent image formed on the photosensitive drum 31 is developed into a toner image by the developing roller 42.

The transfer device 50 includes an intermediate transfer belt 51 and the first transfer rollers 52. The toner images of the colors formed on the photosensitive drums 31 of the photosensitive units 30 are transferred onto the intermediate transfer belt 51 so as to be superposed on one another. The first transfer rollers 52 sequentially transfer (first transfer) the toner images of the colors formed by the photosensitive units 30 onto the intermediate transfer belt 51. The transfer device 50 further includes the second transfer roller 53 and an intermediate-transfer-belt cleaner 54. The second transfer roller 53 collectively transfers (second transfer) the toner images of the colors having been transferred onto the intermediate transfer belt 51 so as to be superposed on one another onto the sheet P that serves as the example of the recording medium. The intermediate-transfer-belt cleaner 54 removes residual toner attracted to the intermediate transfer belt 51.

The toner images of the colors formed on the photosensitive drums 31 of the photosensitive units 30 are sequentially electrostatically transferred (first transfer) onto the intermediate transfer belt 51 by the first transfer rollers 52 to each of which a specified transfer voltage is applied from the power source unit 14 or the like controlled by the image-forming-apparatus controller 11. Thus, superposed toner images formed of the toner images of the colors superposed one another are formed.

Due to a movement of the intermediate transfer belt 51, the superposed toner images on the intermediate transfer belt 51 are transported to a region (second transfer portion TR) where the second transfer roller 53 is disposed. When the superposed toner images are transported to the second transfer portion TR, the sheet P is supplied from the sheet feed device 20 to the second transfer portion TR at timing adjusted to the transportation of the superposed toner images. A specified transfer voltage is applied from the power source unit 14 or the like controlled by the image-forming-apparatus controller 11 to the second transfer roller 53, thereby collectively transferring the superposed toner images from the intermediate transfer belt 51 onto the sheet P fed by the registration roller pair 23 and guided by a transport guide.

The residual toner on the surfaces of the photosensitive drums 31 is removed by the cleaning blades 34 and collected in a waste toner container (not illustrated). The surfaces of the photosensitive drums 31 are charged again by the charging rollers 32. Remaining matter that has not been removed by the cleaning blades 34 and is attracted to the charging rollers 32 is collected on the surfaces of the cleaning rollers 33, which are rotated and in contact with the charging rollers 32, and accumulated.

The fixing device 60 includes a heating module 61 and a pressure module 62. A fixing nip N (fixing region) is defined in a region where the heating module 61 and the pressure module 62 are in pressure contact with each other.

The sheet P onto which the toner images have been transferred by the transfer device 50 but have not yet been fixed is transported to the fixing device 60 through the transport guide. The sheet P transported to the fixing device 60 is subjected to pressure and heat applied thereto by a pair of the heating module 61 and the pressure module 62. Thus, the toner images are fixed.

The sheet P on which a fixed toner image has been formed is output from an output roller pair 69 to the output tray 1*a* in the upper surface of the image forming apparatus 1.

(2) The Drive Force Transmission Device

Figure 2A:
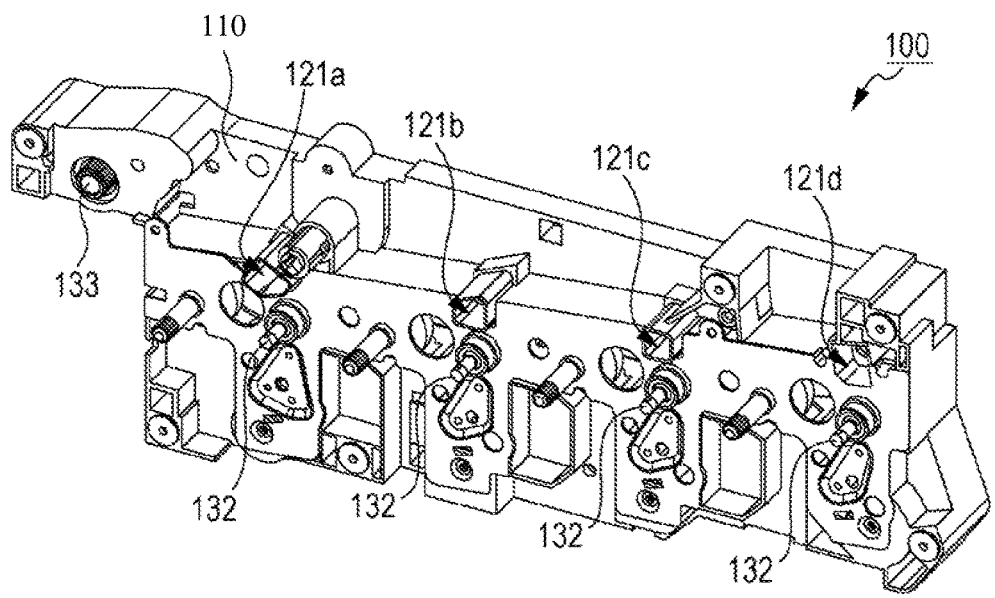
FIG. 2A is a perspective view of a drive force transmission side of a drive force transmission device.
Figure 2B:
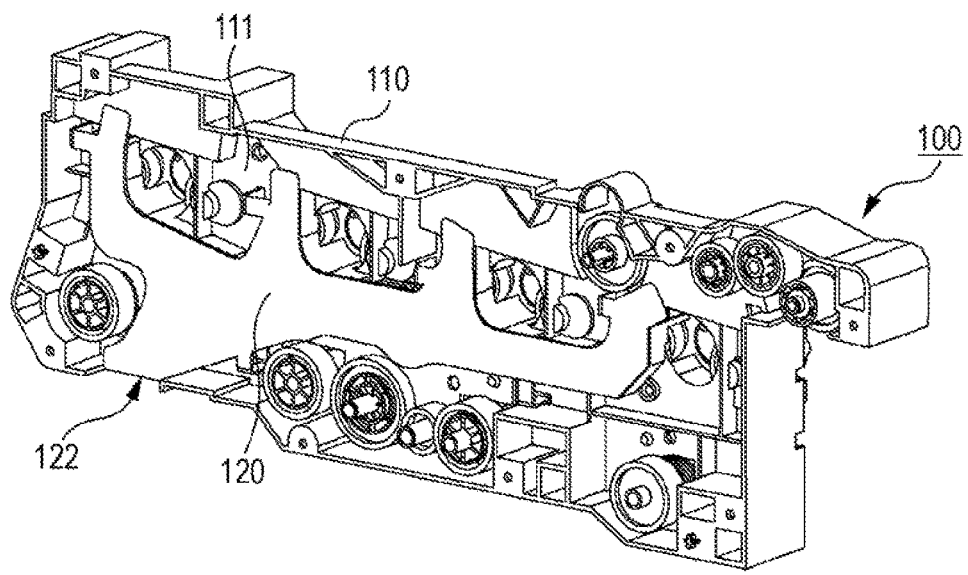
FIG. 2B is a perspective view of an air channel side of the drive force transmission device.
Figure 3A:
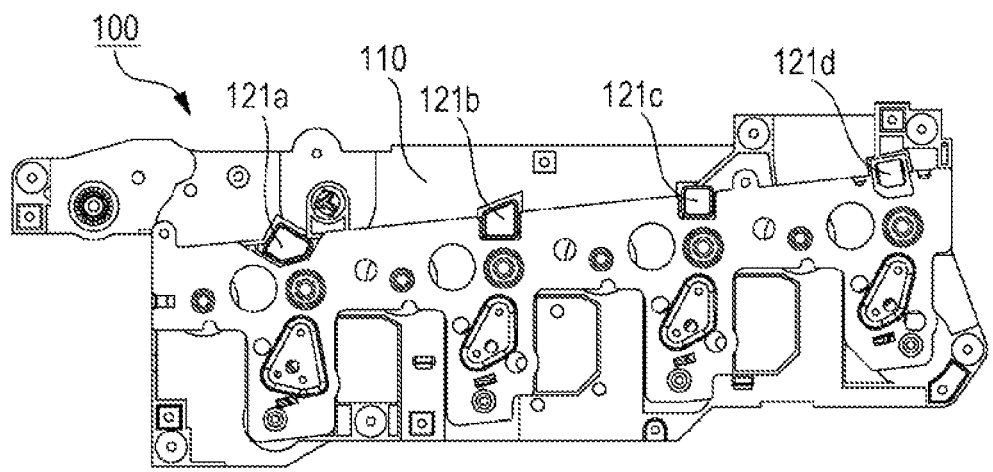
FIG. 3A is a front view of the drive force transmission device.
Figure 3B:
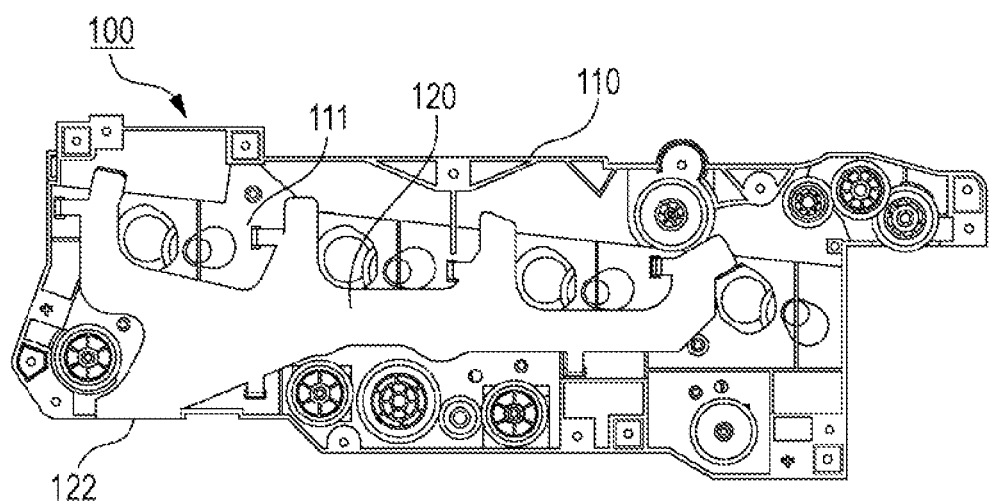
FIG. 3B is a rear view of the drive force transmission device.
Figure 4A:
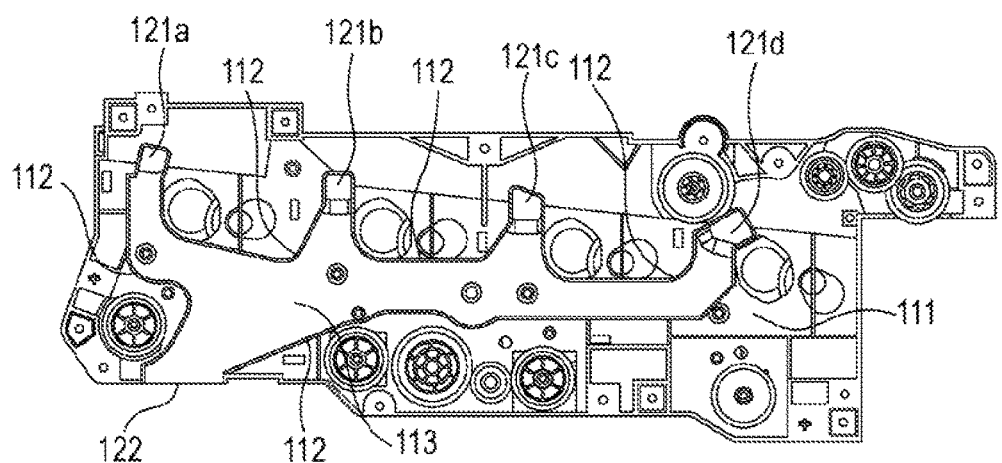
FIG. 4A illustrates flow paths of air channels of the drive force transmission device.
Figure 4B:
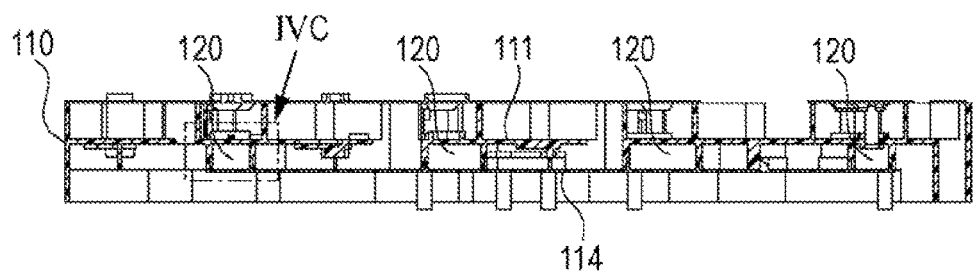
FIG. 4B is a cross-sectional view illustrating arrangement of the air channels and gears of the drive force transmission device.
Figure 4C:
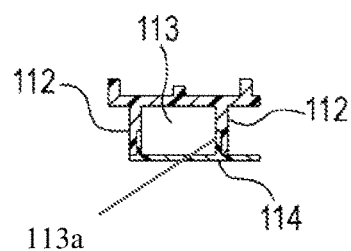
FIG. 4C illustrates part IVC of FIG. 4B.
Figure 5:
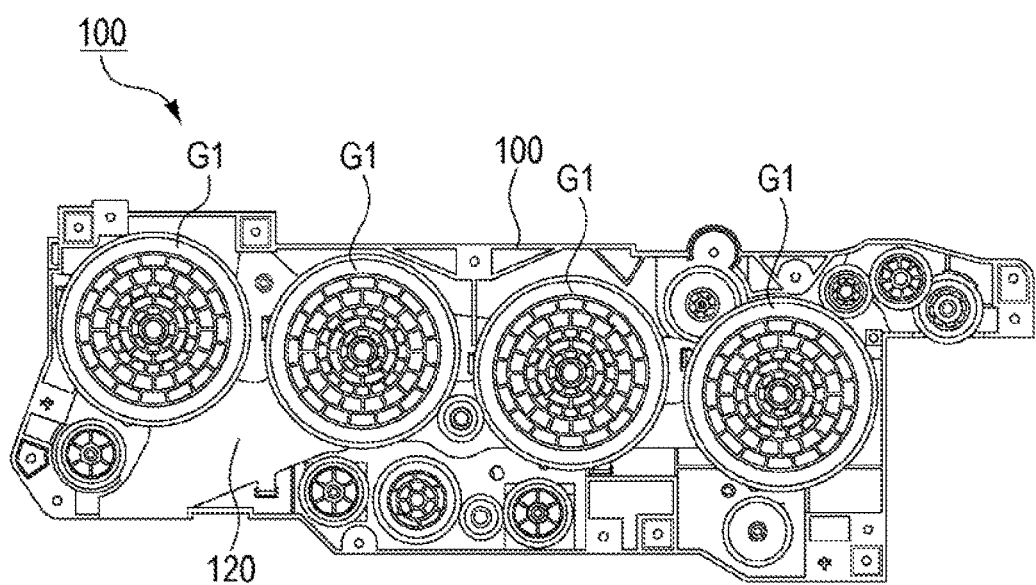
FIG. 5 is a rear view of the air channel side of the drive force transmission device illustrating arrangement of the gears.

FIG. 2A is a perspective view of a drive force transmission side of the drive force transmission device 100, and FIG. 2B is a perspective view of an air channel side of the drive force transmission device 100. FIG. 3A is a front view of the drive force transmission device 100, and FIG. 3B is a rear view of the drive force transmission device 100. FIG. 4A illustrates flow paths of air channels 120 of the drive force transmission device 100, FIG. 4B is a cross-sectional view illustrating arrangement of the air channels 120 and gears G in the drive force transmission device 100, and FIG. 4C illustrates part IVC of FIG. 4B. FIG. 5 is a rear view of the air channel 120 side of the drive force transmission device 100 illustrating arrangement of the gears G.

The structure of the drive force transmission device 100 is described below with reference to the drawings.

(2.1) An Overall Structure of the Drive Force Transmission Device

The drive force transmission device 100 includes a frame 110, the plural gears G, drive transmission members 130, and the air channels 120. The plural gears G transmit rotational drive forces of drive motors M. The drive transmission members 130 transmit rotation of the gears G to rotating bodies.

As illustrated in FIGS. 2A and 3A, the plural drive transmission members 130 supported on the drive force transmission side of the drive force transmission device 100 project from the frame 110. The drive transmission members 130 include drum drive members 131 (illustrated in FIGS. 6A and 6B), developing drive members 132, and a belt drive member 133. The drum drive members 131 rotate the photosensitive drums 31 that serve as an example of the rotating bodies. The developing drive members 132 rotate the developing devices 40. The belt drive member 133 rotates the intermediate transfer belt 51 of the transfer device 50. The drive transmission members 130 transmit the rotational drive forces of the drive motors M to the respective rotating bodies through the plural gears G rotatably supported in the frame 110.

Plural air inlets 121*a*, 121*b*, 121*c*, and 121*d* of the air channels 120 are integrally formed in the frame 110 on the drive force transmission side of the drive force transmission device 100. The plural air inlets 121a, 121b, 121c, and 121d are provided for the photosensitive units 30 and the developing devices 40 of the respective colors (yellow (Y), magenta (M), cyan (C), and black (K)) and connected to a single air outlet 122, which will be described later.

As illustrated in FIGS. 2B and 3B, the air channels 120 are formed on an opposite side to the drive force transmission side of the drive force transmission device 100. One end of each of the air channels 120 is connected to a corresponding one of the air inlets 121a, 121b, 121c, and 121d that are open on the drive force transmission side. The other end sides of the air channels 120 are merged with one another and connected to the single air outlet 122.

(2.2) The Air Channels

As illustrated in FIGS. 4A to 4C, the frame 110 has a flat portion 111 and a recess portion 113. The flat portion 111 extends in a direction intersecting a direction of transmission of the rotational drive forces. The recess portion 113 is formed by a continuous wall portion 112 that is integrally formed with the frame 110 and stands erect on the flat portion 111 of the frame 110.

As illustrated in FIGS. 4B and 4C, the recess portion 113 is defined by the wall portion 112. This recess portion 113 and a cap member 114 disposed on and joined to the wall portion 112 on an opening portion 113a form the air channels 120 having a continuous closed sectional shape that connects the air inlets 121a, 121b, 121c, and 121d to the air outlet 122.

The frame 110 and the wall portion 112, which defines the recess portion 113 of the air channels 120, are integrally formed of synthetic resin. From the viewpoint of strength, examples of the synthetic resin material may include resin such as, for example, acrylonitrile butadiene styrene (ABS), polycarbonate (PC), or polyethylene terephthalate (PET) which are filled with glass fiber. The cap member 114 is also formed of synthetic resin such as ABS or polypropylene (PP).

As illustrated in FIG. 4A, the air inlets 121a and 121b are disposed closer to the air outlet 122 than the air inlets 121c and 121d.

According to the present exemplary embodiment, the air inlet 121a faces the photosensitive unit 30 and the developing device 40 that are used for the yellow (Y) color, and the air inlet 121b faces the photosensitive unit 30 and the developing device 40 that are used for the magenta (M) color. Toner cloud is likely to be generated with the yellow toner and the magenta toner. In particular, the yellow toner, a charging property of which is low compared to the toner of the other colors, is likely to scatter. Thus, by disposing the air inlet and the air outlet near the yellow (Y) side, the toner cloud may be more efficiently collected.

As illustrated in FIGS. 4B and 5, the plural gears G that transmit the rotational drive forces of the drive motors M to the drive transmission members 130 are disposed and supported at positions further to a rear side than the rear surface of the flat portion 111 where the air channels 120 are formed and at positions further to an outer side than the outer surface of the cap member 114 of the air channels 120.

According to the present exemplary embodiment, gears G1 that transmit the rotational drive forces of the drive motors M to the drum drive members 131 are disposed and supported at positions further to the outer side than the outer surface of the cap member 114 of the air channels 120.

Gears G2 (not illustrated) that transmit the rotational drive forces of the drive motors M to the developing drive members 132 are disposed and supported at positions further to the rear side than the rear surface of the flat portion 111 where the air channels 120 are formed.

(3) Attachment of the Drive Force Transmission Device to the Apparatus Body

Figure 6A:
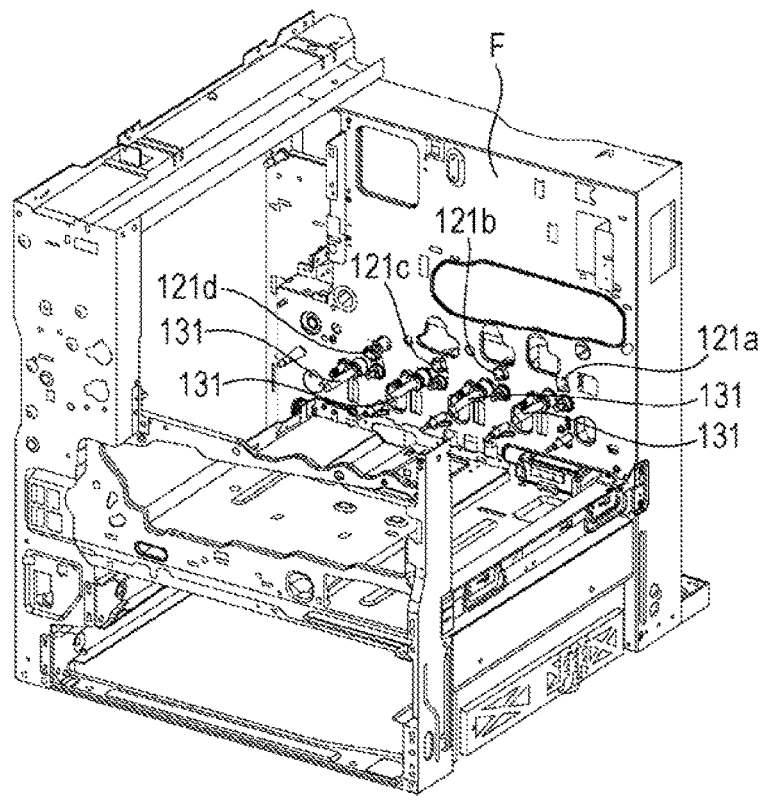
FIG. 6A is a perspective view of an inner surface side of the apparatus body to which the drive force transmission device is attached.
Figure 6B:
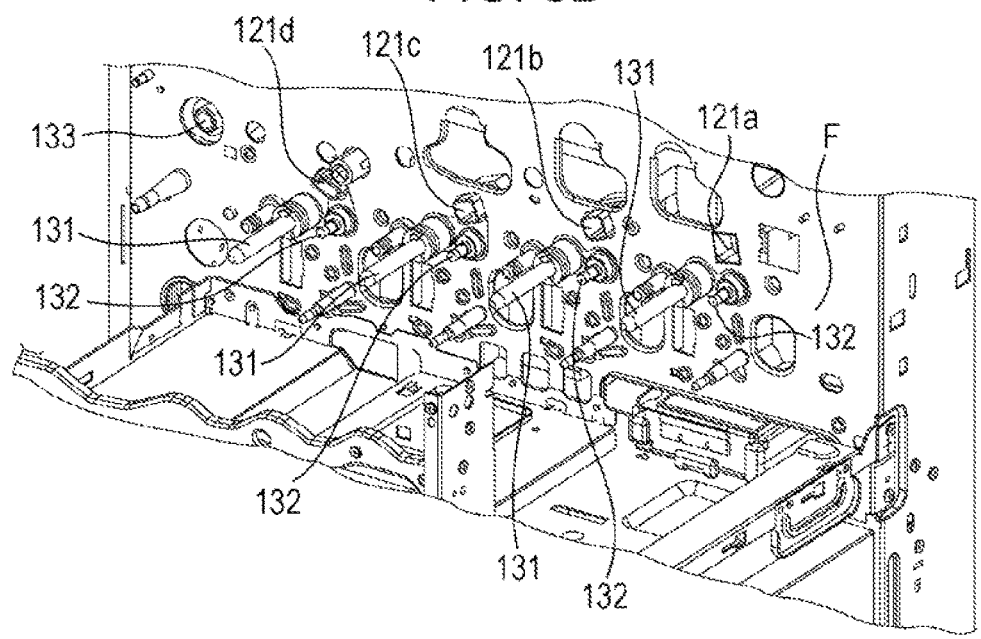
FIG. 6B is an enlarged view of part of the drive force transmission device.
Figure 7A:
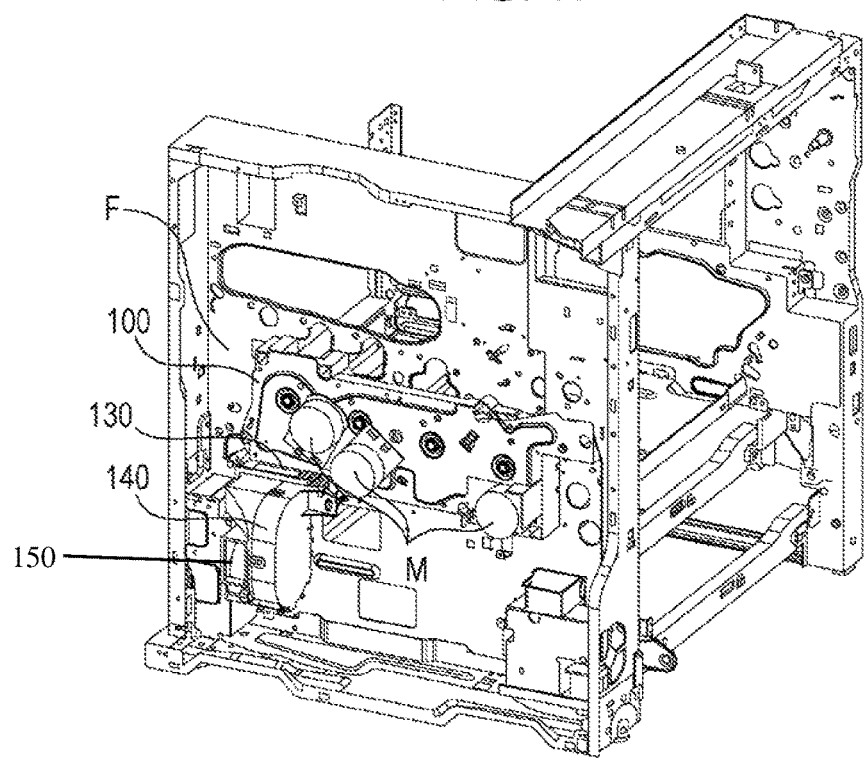
FIG. 7A is a perspective view of a rear side of the apparatus body to which the drive force transmission device is attached.
Figure 7B:
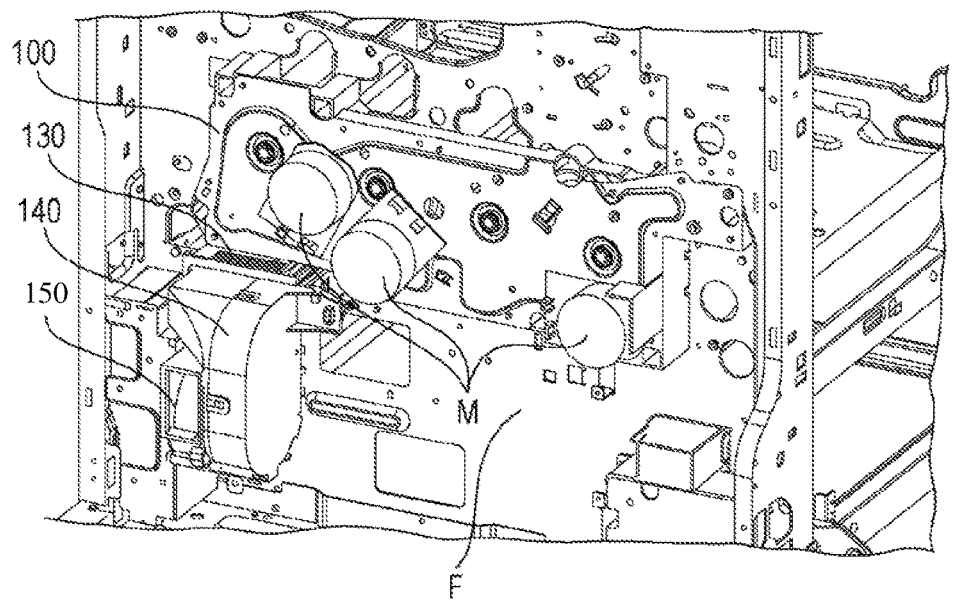
FIG. 7B is an enlarged view of part of the drive force transmission device.
Figure 8:
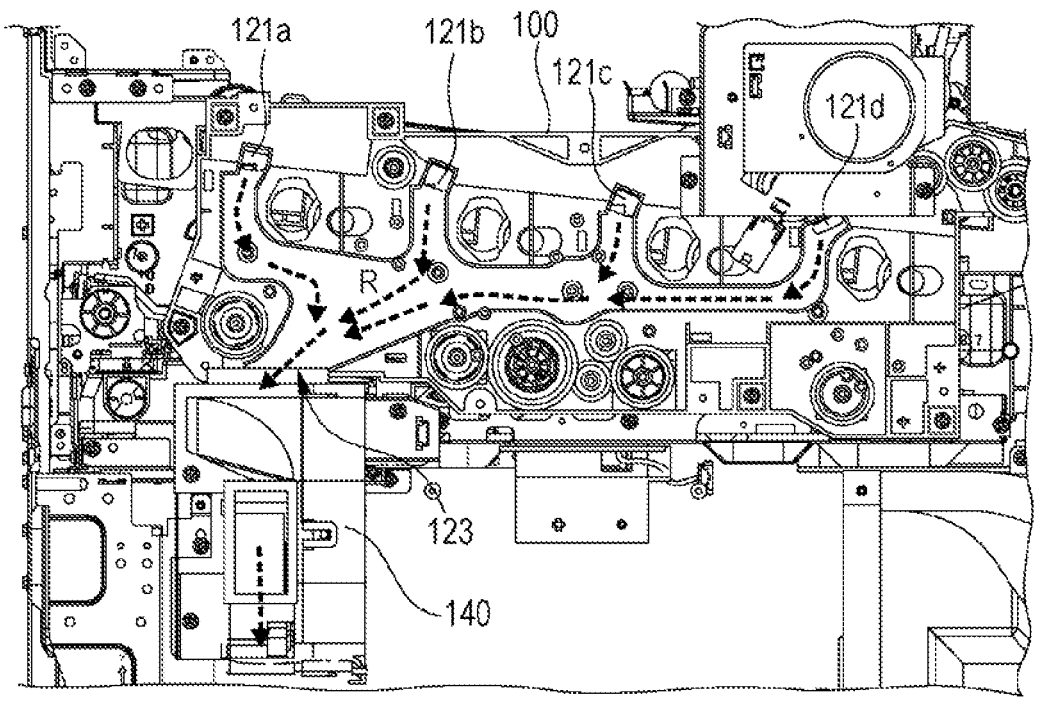
FIG. 8 illustrates flows of air in the apparatus body.

FIG. 6A is a perspective view of an inner surface side of the apparatus body with the drive force transmission device 100 attached, and FIG. 6B is an enlarged view of part of the drive force transmission device 100. FIG. 7A is a perspective view of a rear side of the apparatus body with the drive force transmission device 100 attached, and FIG. 7B is an enlarged view of part of the drive force transmission device 100. FIG. 8 illustrates flows of air in the apparatus body.

Attachment of the drive force transmission device 100 to the apparatus body and the flows of air are described below with reference to the drawings.

As illustrated in FIGS. 6A and 6B, the drive force transmission device 100 is secured to a housing F of the apparatus body in a state in which the drive motors M are attached to the drive force transmission device 100 and the drive transmission members 130 project from the housing F to the inner surface side of the apparatus body. In this state, the air inlets 121a, 121b, 121c, and 121d of the air channels 120 are open on the inner surface side of the apparatus body.

The photosensitive units 30, the developing devices 40, and the transfer device 50 are respectively attached to the drive transmission members 131, 132, and 133 of the drive force transmission device 100 from a front surface side of the apparatus body (see FIG. 1), so that the rotational drive forces of the drive motors M are transmitted to the photosensitive units 30, the developing devices 40, and the transfer device 50.

As illustrated in FIGS. 7A and 7B, a filter member 140 and an exhaust fan 150 are provided on the rear surface side of the apparatus body where the drive force transmission device 100, to which the drive motors M are attached, is attached. The filter member 140 is connected to the air outlet 122 of the drive force transmission device 100. Air exhausted through the air channels 120 and the air outlet 122 of the drive force transmission device 100 is exhausted to the outside of the apparatus body through the filter member 140 by the exhaust fan 150.

The filter member 140 allows the air exhausted from the air outlet 122 to pass therethrough and traps the toner cloud and foreign matter contained in the air, thereby purifying the air exhausted by the exhaust fan 150 to the outside of the apparatus body.

The exhaust fan 150 according to the present exemplary embodiment is of a centrifugal type including a centrifugal impeller (not illustrated). The exhaust fan 150 compresses the air having passed through the filter member 140 and exhausts the air to the outside of the apparatus body through a discharge port 151.

As illustrated in FIG. 8, in the image forming apparatus 1 that includes the drive force transmission device 100 having the structure as described above, the air in the apparatus body including regions around the photosensitive units 30, the developing devices 40, and the transfer device 50 disposed in the apparatus body, flows as follows: the air is sucked through the air inlets 121a, 121b, 121c, and 121d, passes through the air channels 120, and is introduced into the filter member 140 through the air outlet 122.

After the toner cloud and the foreign matter contained in the air have been trapped by the filter member 140, the air is compressed by and exhausted to the outside of the apparatus body by the exhaust fan 150 (see arrows R of FIG. 8).

The drive force transmission device 100 according to the present exemplary embodiment has air channels 120. The air channels 120 connect the air inlets 121a, 121b, 121c, and 121d, which are open on the drive force transmission side of the flat portion 111 of the frame 110 supporting the gears G and the drive transmission members 130, to the air outlet 122. The air outlet 122 of the air channels 120 is connected to the exhaust fan 150 through the filter member 140.

Thus, the dimension of the apparatus body in the depth direction may be reduced and blow-off of the toner cloud may be suppressed. Furthermore, by forming the air channels 120 in the drive force transmission device 100, the drive force transmission device 100 may be efficiently cooled.

The plural gears G that transmit the rotational drive forces of the drive motors M to the drive transmission members 130 are disposed and supported at positions further to the rear side than the rear surface of the flat portion 111 where the air channels 120 are formed and at positions further to the outer side than the outer surface of the cap member 114 of the air channels 120.

Accordingly, the air that is sucked from the inside of the apparatus body and contains the toner cloud and the foreign matter passes through the air channels 120 that are separated from the gears G1 and G2 and have the closed sectional shape. This may suppress attraction of the toner cloud and the foreign matter to the gears G1 and G2.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A drive force transmission device comprising:
    a frame that supports therein a plurality of gears transmitting a rotational drive force and that has a flat portion extending in a direction intersecting a direction in which the rotational drive force is transmitted,
    wherein the drive force transmission device has an air channel that allows air sucked from an outside of the frame to pass therethrough so as to exhaust the air to the outside of the frame,
    wherein a cap member having an outer surface is provided,
    wherein the flat portion has a rear surface, and
    wherein the plurality of gears are disposed and supported at a position or positions further towards a rear side than the rear surface of the flat portion where the air channel is formed and at a position or positions further towards an outer side of the outer surface of the cap member for the air channel.

2. The drive force transmission device according to claim 1,
    wherein the frame has one surface and another surface,
    wherein a plurality of air inlets are formed on a front surface side of the flat portion of the frame on a one surface side of the frame,
    wherein a single air outlet is formed on another surface side of the frame, and
    wherein the air channel has a continuous closed sectional shape that connects the plurality of air inlets to the single air outlet.

3. The drive force transmission device according to claim 1,
    wherein a wall portion is provided so as to stand erect on the flat portion of the frame,
    wherein a recess portion having an opening is defined by the wall portion, and
    wherein the air channel is a closed structure formed by the recess portion and the cap member that is disposed on and joined to the wall portion on an opening side of the recess portion.

4. The drive force transmission device according to claim 1,
    wherein a plurality of air inlets and an air outlet are provided, and
    wherein at least one of the plurality of air inlets is disposed closer to the air outlet than the other air inlet of the plurality of air inlets or the other air inlets of the plurality of air inlets.

5. The drive force transmission device according to claim 1, wherein the air channel is formed in the frame formed of synthetic resin.

6. An image forming apparatus comprising:
    an apparatus body;
    the force transmission device according to claim 1 having an air outlet;
    a drive motor that rotates the plurality of gears of the drive force transmission device;
    a rotating body that is rotated by receiving the rotational drive force from the drive force transmission device;
    a filter member connected to the air outlet of the drive force transmission device; and
    an exhaust fan that exhausts the air having passed through the air channel of the drive force transmission device to an outside of the apparatus body through the filter member and the air outlet of the drive force transmission device.

7. An image forming apparatus comprising a drive force transmission device comprising:
    a frame that supports therein a plurality of gears transmitting a rotational drive force and that has a flat portion extending in a direction intersecting a direction in which the rotational drive force is transmitted,
        wherein the drive force transmission device has an air channel that allows air sucked from an outside of the frame to pass therethrough so as to exhaust the air to the outside of the frame,
        wherein the frame has one surface and another surface,
        wherein a plurality of air inlets are formed on a front surface side of the flat portion of the frame on a one surface side of the frame, and
        wherein at least one of the plurality of air inlets faces a photosensitive drum.

* * * * *